UNITED STATES PATENT OFFICE.

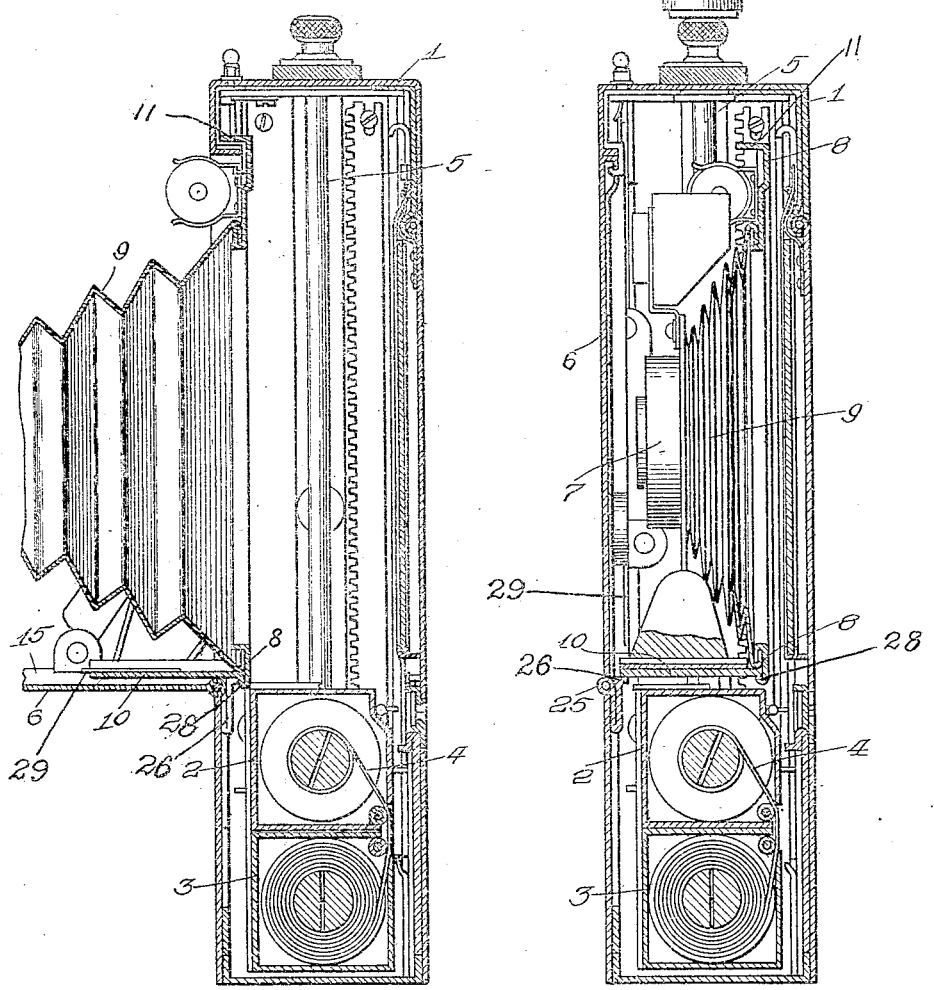

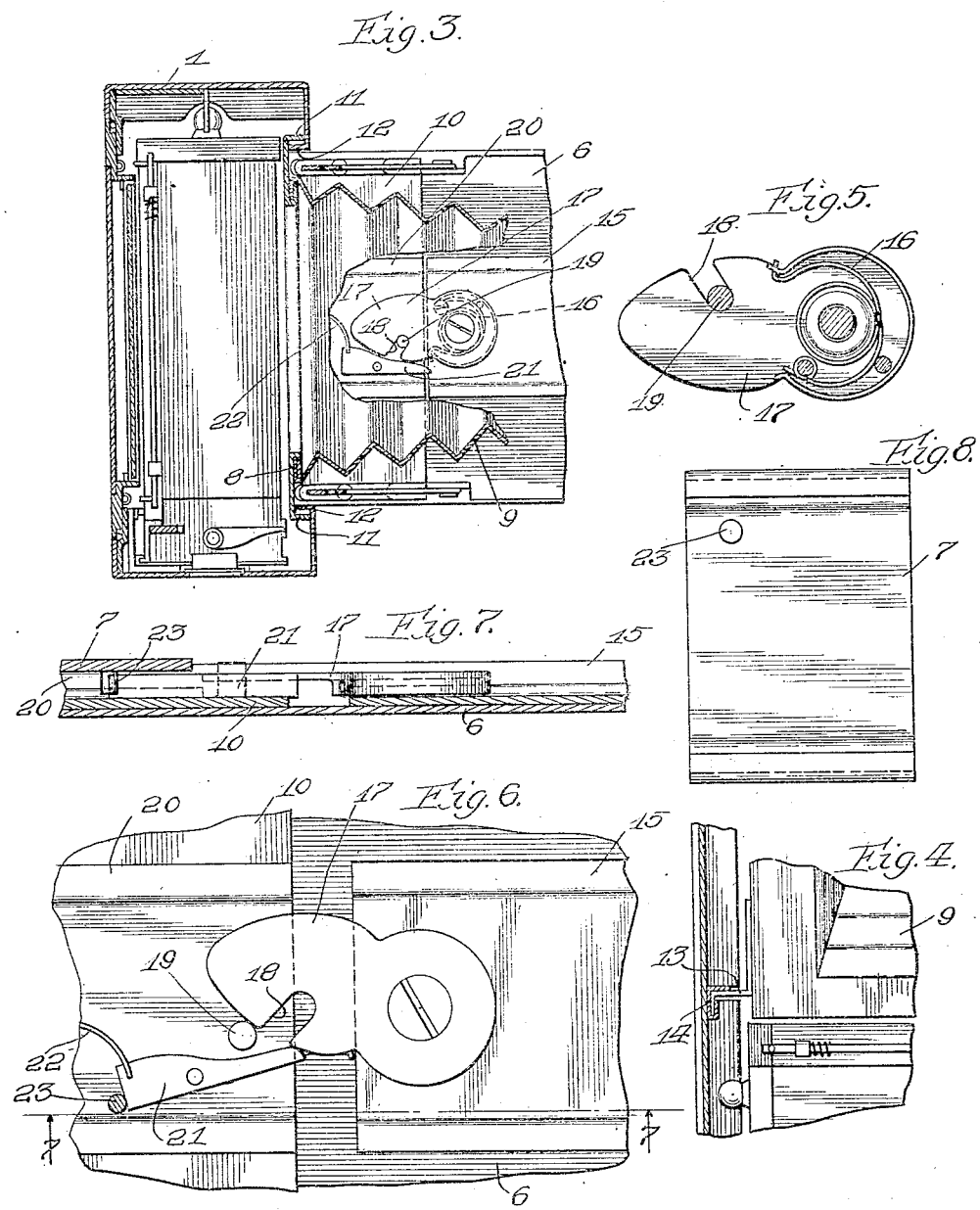

WILLIAM A. PETERS, OF CHICAGO, ILLINOIS, ASSIGNOR TO INTERNATIONAL PATENT LICENSING CORPORATION, OF CHICAGO, ILLINOIS, A CORPORATION OF DELAWARE.

CAMERA.

1,292,036.           Specification of Letters Patent.      Patented Jan. 21, 1919.

Application filed June 7, 1915. Serial No. 32,480.

*To all whom it may concern:*

Be it known that I, WILLIAM A. PETERS, a citizen of the United States, residing at Chicago, in the county of Cook and State of Illinois, have invented certain new and useful Improvements in Cameras; and I do hereby declare the following to be a full, clear, and exact description of the invention, such as will enable others skilled in the art to which it appertains to make and use the same.

My invention relates to improvements in photographic cameras and more particularly to bellows cameras of a certain type or types in which space is required for the movement of a certain part or parts within the casing which necessitates the provision of additional space for housing the bellows and lens-board carriage when the camera is folded.

The main object of the present invention is to provide means in a camera of the type or types referred to for housing all of the internal parts requiring operating space within so much space as is ordinarily required by one of said parts.

My invention relates essentially to the particular type of camera illustrated and described in my copending application for patent, Ser. No. 859612, filed Sept. 1, 1914, but may be successfully adapted to other types having internal operative parts requiring space. I refer particularly to cameras of the type illustrated and described in Letters Patent to J. D. Garfield No. 713,629 dated Nov. 18, 1902, and No. 932,457, to W. F. Folmer, dated Nov. 18, 1902, and all others in which substantially the same conditions prevail.

The invention consists in the features of construction and combinations of parts hereinafter fully described and claimed.

In the accompanying drawings illustrating that embodiment of my invention adapting it for use in the camera illustrated and described in my aforesaid copending application:

Figure 1 is a vertical section through a closed camera constructed in accordance with my invention.

Fig. 2 is a fragmentary vertical section through the same camera with the bellows member in its operative position.

Fig. 3 is a fragmentary horizontal plan section of the same embodiment.

Fig. 4 is a fragmentary vertical section looking forwardly of the camera and showing the means for guiding the rear end of the bellows member.

Fig. 5 is an enlarged upward view of the cam element of Fig. 3.

Fig. 6 is a fragmentary horizontal section showing the means for locking the rear bellows frame against movement relatively to the auxiliary track section.

Fig. 7 is a vertical section through Fig. 6 along the line 7—7.

Fig. 8 is an enlarged upward view of the under side of the lens front.

In the embodiment illustrated, the casing 1 of the camera houses a pair of spool holders 2 and 3, which may be moved within the casing so as to stretch successive portions of the film 4 within the cone of light of the camera. When the camera is not in use, these spool holders are moved by the actuating rod 5 into the bottom of the casing, where they are stored substantially outside the cone of light of the camera, as shown in Fig. 1. The casing 1 is equipped with a pivotal drop front 6, which may be disposed as in Fig. 2, thereby affording an anterior opening through which the bellows member of the camera may be projected. This bellows member consists essentially of a lens board carriage 7 connected to a rear bellows frame 8 by bellows 9, the total length of the bellows member and lens-housing when compacted being less than the interior depth of the casing. The frame 8 has integral with its lower portion a forwardly directed projection 10 adapted to overhang the hinges 25 of the drop front 6 when the bellows member is extended, thereby preventing a leakage of light into the casing through the joints of these hinges. The other three sides of the frame 8 have forwardly directed flanges 11 which flanges overhang rearwardly directed flanges 12 on the front of the casing when the bellows member is in the position of Figs. 2 and 3. The frame 8 also has at its opposite sides angle-sectioned guides 13 slidably fitting into guideways 14 carried by the casing, whereby the said frame together with the bellows (and lens board carriage carried by the same) may be guided back and forth with respect to the casing.

The front table 6 has the usual track 15 for the lens board carriage, the latter being slidable on this track and equipped with means (not shown in the drawings) for locking it to the track at any point corresponding to the desired focus. Rigidly mounted upon the projection or platform 10 is an auxiliary track section 20 alining with the track 15, which section 20 will substantially abut against the rear end of said track when the bellows are extended, so as to form an extension track upon which the lens front may be slipped to and from the main track section 15. Mounted upon the track 15 and continuously forced in one direction by a spring 16 is a cam element 17 having a notch 18 adapted to receive and interlock with a pin 19 carried by the auxiliary track section 20. The pin 19 also serves as a stop for limiting the swinging movement of a lever 21 pivoted upon the track section 20, which lever is normally moved in one direction by a spring 22, thereby interposing the rear end of the lever in the path of a pin 23 projecting downwardly from the lens front.

When the camera is not in service, the bellows member is entirely housed by the casing and the rear frame of this member is adjacent to the rear wall of the casing as shown in Fig. 2. For use, the drop front 6 is lowered and the bellows member is drawn out by grasping the lens board carriage and pulling it forward, in doing which the entire bellows member is first moved bodily with respect to the casing, thereby bringing the platform 10 and the flanges 11 into light-excluding relation to the portions of the camera bordering the anterior opening in the casing. As the platform 10 and the track section 20 carried thereby approach the rear end of the main track 15, the pin 19 engages the cam 17 and partially rotates this against the pressure of the spring 16, as shown in Fig. 7.

On moving the track section 20 still farther, the pin 19 snaps into the notch 18, thereby permitting the cam element to swing back, in doing which it engages the forward end of the lever 21 so as to rotate the latter into the position of Fig. 3. This movement of the lever 21 carries the rear end of the lever out of the path of the pin 23, so that a continued pull on the lens board carriage will allow the latter to slide with respect to the section 20 and will carry this lens board carriage out upon the main track 15. Thus, a single and continuous pull upon the lens board carriage will first move the bellows member forward with respect to the casing and will then extend this member so as to have the bellows project from the interior of the front of the casing through the opening in this front, after which the camera may be focused by suitably sliding the lens board carriage upon the track 15. The spring 22 may be quite weak, but the spring 16 is preferably so strong that it will coöperate with the obtuseness of the angle between the sides of the notch 18 and the axis of the track 15 to prevent an accidental unlatching of the pin 19 from the said notch. Consequently, this pin will be held latched to the cam 17 while the lens board carriage is being slid back and forth to adjust the focus, thus maintaining the rear frame of the bellows member in its light-excluding engagement with the casing. When the camera is to be folded, the lens board carriage is slid back upon the main track 15 and upon the auxiliary section 20 until the rear end of the lens board carriage engages the frame 8, by which time the pin 23 will have passed to the rear of the lever 21. Then a continuous rearward thrust upon the lens board carriage will cause the latter to move the frame 8 with it, whereupon the pin 19 will rotate the cam element 17 by engagement with the rear face of the notch, thus permitting the said pin to be unlatched. Thus, the rear end of the bellows member is automatically latched and unlatched by the simple act of extending or compacting the bellows member.

By moving the rear frame of the bellows member with respect to the casing and by storing both the lens board carriage and the bellows in positions to the rear of that occupied by the rear frame of the bellows member when the latter is extended, I obtain the required storage space in a casing of much smaller depth than that required where the bellows are attached rigidly to the casing. However, the simple act of drawing out the lens board carriage automatically actuates the light-excluding means and moves the bellows out of the path of the roll holders, so that no additional manipulation is required. To avoid a tilting of the lens-board carriage on the drop front, I preferably provide guides 29 mounted on the drop front at opposite sides of the carriage and engaging the projection 10 as shown in Fig. 2. I also preferably equip the frame 6 at its juncture with the projection 10 with a downwardly directed bend 28 adapted to engage a stop 26 on the hinge, thereby limiting the forward travel of the lens-board carriage.

By reference to Fig. 2, it will be observed that as soon as the housing 2 for one of the film-spools is moved from the positions shown it will become disposed in the path of the bellows-frame 6 and will thus prevent inward movement of the latter. This is important to insure the exclusion of light from the film as soon as any part of the film becomes disposed in the exposure plane of the camera.

I claim as my invention:

1. A camera including a housing having an opening in a wall thereof, a drop-front pivoted to said wall and constituting a closure for said opening, a bellows, a frame connected with one end thereof movable within said housing, and adapted to engage portions of said wall bordering said opening for limiting the movement of said frame in one direction, a lens-board connected with the other end of said bellows, a carriage for the same adapted to travel on said drop-front toward and from said wall of the housing, and tension-imparting means associated with said bellows frame and said drop-front for firmly holding said frame in engagement with said wall of said housing when said bellows is expanded.

2. In a bellows-camera having a housing having a frontal opening equipped with a pivoted drop-front constituting a closure for said opening and constituting a support, a lens board carriage adapted to travel on said support, a rear bellows-frame mounted within said housing and movable toward and from said opening and adapted to engage the portions of said housing bordering said opening to exclude light from said housing, and tension-imparting means associated with said frame and said drop-front for firmly holding said frame in engagement with said wall of said housing.

3. In a bellows-camera having a housing having a frontal opening equipped with a pivoted drop-front constituting a closure for said opening and constituting a support, a lens board carriage adapted to travel on said support, a rear bellows-frame mounted within said housing and movable toward and from said opening and adapted to engage the portions of said housing bordering said opening to exclude light from said housing, and tension imparting means actuated by engagement of said lens-board carriage with said drop-front for firmly holding said frame in engagement with said wall of said housing.

4. In a bellows-camera having a housing having a frontal opening equipped with a pivoted drop-front constituting a closure for said opening and constituting a support, a lens board carriage adapted to travel on said support, inwardly extending flanges bordering said opening, a bellows frame having edge-flanges adapted to overlap the flanges bordering said opening mounted in said housing and movable toward and from said opening, and tension-imparting means associated with said frame and said drop-front for firmly holding said frame in engagement with said wall of said housing.

5. In a bellows-camera having a housing having a frontal opening equipped with a pivoted drop-front constituting a closure for said opening and constituting a support, a lens board carriage adapted to travel on said support, a rear bellows-frame mounted within said housing and movable toward and from said opening and adapted to engage the portions of said housing bordering said opening to exclude light from said housing, a track on said drop front for guiding said lens-board carriage, a plate movable on said track and adapted to be slid into said housing, said plate equipped with means for slidably engaging said lens-board carriage and adapted to support the latter within said housing.

6. In a bellows-camera having a housing having a frontal opening equipped with a pivoted drop-front constituting a closure for said opening and constituting a support, a lens board carriage adapted to travel on said support, a rear bellows-frame mounted within said housing and movable toward and from said opening and adapted to engage the portions of said housing bordering said opening to exclude light from said housing, a track on said drop front for guiding said lens-board carriage, a plate movable on said track and adapted to be slid into said housing, said plate equipped with a flange adapted to overhang the pivotal connection between said housing and said drop front to exclude light from the latter when said front is dropped.

7. In a camera, the combination with a casing having a frontal opening, of a pivoted drop-front normally closing said opening and adapted to be extended in front of the opening and parallel with the axis of same, a lens board carriage and a bellows-frame both slidable upon said drop front when the latter is thus extended, bellows engaged with said frame and said lens-board carriage and independent means for latching said frame and lens-board carriage to the drop-front.

8. In a camera, the combination with a casing having a frontal opening, of a pivoted drop-front normally closing said opening and adapted to be extended in front of the same parallel with the axis thereof, a lens board carriage and a bellows-frame both slidable upon said drop-front when the latter is thus extended, said frame adapted to seal the frontal opening against the admission of light when moved in one direction, and means for simultaneously stopping said frame and latching the latter to the drop-front to prevent accidental retraction of said frame.

9. In a camera, the combination with a casing having a frontal opening, of a pivoted drop front normally closing said opening and adapted to be extended in front and parallel with the axis of the opening, a lens board carriage and a bellows-frame both slidable upon said drop-front when the latter is thus extended, and means for simultaneously stopping said frame and latching the latter to the drop-front to prevent accidental retraction of said frame, said means being actuated by the sliding of the lens-board carriage forwardly upon the drop-front; and means adapted to be engaged by the lens-board carriage as the latter moves rearwardly for unlatching said frame and thereafter sliding the latter into the casing.

10. In a camera, the combination with a casing having a frontal opening, of a pivoted drop-front normally closing said opening and adapted to be extended in front and parallel with the axis of the opening; a lens-board carriage and a bellows frame both slidable upon said drop front when the latter is thus extended; means for simultaneously stopping said frame and latching the latter to the drop-front to prevent accidental retraction of said frame; said latching means including coöperating cam elements carried respectively by the drop-front and by said frame, and a spring for interlocking said elements against accidental relative movement, the cam elements being adapted to be moved out of their said interlocked relation by the rearward sliding of the lens front.

11. In a camera, the combination with a casing having a drop front, of a bellows member normally housed by said casing and including a rear bellows frame, a lens-board carriage, and bellows connecting said parts, alined but normally spaced track sections carried respectively, by said frame and drop-front, the lens-board carriage being slidable upon said track; means for engaging the lens-board carriage with the track section carried by the frame for moving the latter forward to the track section on said drop-front as said lens-board carriage is moved forward, and means for latching said track-section carried by said bellows-frame in its said position while the lens-board carriage is upon the track section carried by the drop-front.

12. In a camera, the combination with a casing having a drop-front, of a bellows member normally housed by said casing and including a bellows-frame, a lens-board carriage, bellows connecting the said parts, alined but normally spaced track sections carried respectively, by said frame and drop-front, the lens-board carriage being slidable upon said track; means for engaging the lens-board carriage with the track section carried by the bellows-frame to cause the initial forward movement of said lens front to move said section substantially up to the other of said track sections, means for latching said track section carried by said frame in its said position while the lens-board carriage is upon the track section carried by the drop-front, and means for simultaneously unlatching said bellows-frame and effecting engagement between the latter and the lens-board carriage as the latter is moved upon the track section carried by said bellows-frame.

13. In a bellows-camera equipped with a pivoted drop-front carrying a track-section adapted to receive the lens-board carriage, a rear bellows-frame reciprocably movable within the camera housing and carrying a track section adapted to coact with the track-section of the drop-front to form a continuous guide for said lens-board carriage, the latter normally disposed upon said track-section of said frame and means effecting operative engagement between said frame and said carriage for imparting movement to the latter within the limits of movement thereof as said carriage is manually reciprocated, and means on said drop-front for automatically releasing said carriage from engagement with said frame and latching the latter against retraction as said carriage and frame are moved to the forward limit of movement of the latter.

14. In a bellows-camera equipped with a pivoted drop-front carrying a track-section adapted to receive the lens-board carriage, a rear bellows-frame reciprocably movable within the camera housing and carrying a track section adapted to coact with the track-section of the drop-front to form a continuous guide for said lens-board carriage, the latter normally disposed upon said track-section of said frame and means effecting operative engagement between said frame and said carriage for imparting movement to the latter within the limits of movement thereof as said carriage is manually reciprocated, and means on said drop-front for automatically releasing said carriage from engagement with said frame and latching the latter against retraction as said carriage and frame are moved to the forward limit of movement of the latter, and vice versa effecting unlatching of said frame and engagement of said carriage therewith as the latter is moved to the rearward limit of its movement.

15. A camera including a casing; a bellows member comprising a bellows, a lens-board carriage and a bellows-frame, and coupling means for engaging said lens-board carriage with said frame whereby a forward movement of the lens-board carriage will move said bellows and frame bodily with respect to the casing, and uncoupling means disposed in the path of said coupling means, whereby said lens-board carriage is enabled to continue its movement to extend said bellows.

16. A camera including a casing having a frontal opening, a bellows member normally positioned with its rear end portion spaced from the front of the casing, and means operated by a drawing out of the bellows member for bringing the rear end of said member into light-excluding relation to the front of the casing.

17. A camera including a casing; a bellows member comprising bellows, a lens-board carriage, and a rear element connected by the bellows; and means for causing a forward movement of the carriage to move said bellows member bodily with respect to the casing, and to latch the rear end of the bellows member in light-excluding relation to the front of the casing, and thereafter to extend said bellows.

18. A camera including a casing, a bellows member comprising a bellows, a lens-board carriage and a rear element, and means for causing a forward movement of the lens board-carriage to move said bellows member to bring the rear end thereof into light-excluding relation to the casing without extending the bellows, and means for maintaining the rear end of the bellows member in its said light-excluding position while the bellows are being extended and contracted by a movement of the lens-board carriage relatively to the said rear element.

19. In a bellows camera including a casing having a wall provided with an opening and means within said casing operable to position a sensitized element in the exposure plane and to remove the same therefrom alternately, a bodily movable bellows member disposed within the casing and adapted to be extended to project through said opening, said bellows-member adapted, when disposed within the casing, to occupy the space required by said operable means to prevent positioning of said sensitized element in the exposure plane, the said operable means adapted to occupy the said space when said bellows is projected to prevent return of said bellows into the housing until the sensitized element is disposed out of the exposure plane.

In testimony whereof I have signed my name in presence of two subscribing witnesses.

WILLIAM A. PETERS.

Witnesses:
ALBERT SCHEIBLE,
D. KENTNICH.

Copies of this patent may be obtained for five cents each, by addressing the "Commissioner of Patents, Washington, D. C."